(12) United States Patent
Janatka et al.

(10) Patent No.: US 6,719,480 B1
(45) Date of Patent: Apr. 13, 2004

(54) METHOD OF ASSEMBLING PARTS WITH INTERLOCKING DEVICE

(75) Inventors: Karel J. Janatka, Southbury, CT (US); Neil J. Kennedy, Woodbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 10/269,290

(22) Filed: Oct. 11, 2002

(51) Int. Cl.[7] .................................................. F16B 2/00
(52) U.S. Cl. .................... 403/373; 403/374.2; 411/344; 411/345; 411/104
(58) Field of Search ............................. 403/373, 374.1, 403/374.2, 374.3, 374.4, 403, 382, 292; 411/104, 344, 345, 346, 340, 84, 85

(56) References Cited

U.S. PATENT DOCUMENTS 4,883,398 A * 11/1989 Duncan ...................... 411/344
5,775,859 A * 7/1998 Anscher ...................... 411/38
2003/0177724 A1 * 9/2003 Botting ...................... 52/302.1

* cited by examiner

Primary Examiner—John R. Cottingham
(74) Attorney, Agent, or Firm—Michael J. Cummings; Charles R. Malandra, Jr.; Angelo N. Chaclas (57) ABSTRACT

A method of joining a first sheet-metal member to a second sheet-metal member in a right-angle relationship using an H-shaped interlocking member. An opening is provided near an edge of the second sheet metal member with a channel communicating the opening and the edge. The opening is sufficiently wide to allow the H-shaped member to be rotated therein so as to allow the upper and lower slots of the H-shaped member to engage with the second sheet-metal member. A tapped hole is provided in the center section of the H-shaped member, aligned with the channel, so as to allow a screw to be inserted through a hole on the first sheet-metal member and then the channel to engage with the tapped hole. After the screw is tightened, the surface of the first sheet metal member is securely joined to the edge of the second sheet metal member.

13 Claims, 9 Drawing Sheets

METHOD OF ASSEMBLING PARTS WITH INTERLOCKING DEVICE

FIELD OF INVENTION

The present invention relates generally to assembling of sheet materials and, in particular, to assembling of sheet materials at a right angle with an interlocking member.

BACKGROUND OF INVENTION

When joining two pieces of material at a right angle such that the surface of a first piece must be securely joined with the edge of the second piece, tapped holes are usually provided on the edge of the second piece so that screws can be inserted through openings on the surface of the first piece in order to engage with the tapped holes. In many cases, however, the edge of the second piece of material is not thick enough to accommodate sufficiently large screws. Angle brackets or the like can be used for right angle assembling.

Furthermore, when parts are assembled in tight quarters, space considerations may pose a problem. Using conventional methods for assembling parts may be undesirable. Thus, it is advantageous and desirable to provide a method to assemble mechanical parts which is easy to carry out, especially in tight space conditions.

SUMMARY OF INVENTION

According to the first aspect of the present invention, there is provided a method of joining a first piece of material to a second piece of material with an interlocking member having a first end and an opposing second end, wherein the second piece of material has an edge to be joined to a surface of the first piece of material. The method is characterized by providing on the surface of the first piece of material an aperture, by providing on a surface of the second piece of material
an opening near the edge, and
a channel communicating the opening and the edge, by providing on the interlocking member:
a first slot on the first end along an alignment axis,
a second slot on the second end along the alignment axis and separated from the first slot by a middle section having a length, and
a hole in the middle section, wherein
the channel on the second piece of material has a width greater than the thickness of the interlocking member,
the opening on the second piece is wider than or substantially equal to the length of the middle section of the interlocking member, and
the first and second slots of the interlocking member have a width greater than the thickness of the second piece of material around the opening, by inserting the interlocking member into the opening until the middle section of the interlocking member is located inside the opening, by moving the interlocking member so that both the first and second slots of the interlocking member engage with the second piece of material, by positioning the first piece of material near the second piece of material in front of the edge of the second piece of material such that the aperture of the first piece of material is adjacent to the channel, and by inserting a fastening member through the aperture of the first piece of material and then the channel on the second piece of material so as to allow the fastening member to securely engage with the hole of the interlocking member.

Preferably, the hole on the interlocking member is tapped and the fastening member comprises a screw.

According to the second aspect of the present invention, there is provided a mechanical assembly of parts comprising a first piece of material joined to a second piece of material with an interlocking member and a fastening member, wherein the interlocking member has a thickness, a first end and a second end, and the second piece of material has an edge joinable to a surface of the first piece of material. The assembly is characterized by on the first piece of material:
an aperture provided on the surface of the first piece of material; on the second piece of material:
an opening provided near the edge of the second piece of material having a thickness around the opening,
a channel communicating the opening and the edge; and
on the interlocking member:
a first slot provided on the first end along an alignment axis,
a second slot provided on the second end along the alignment axis and separated from the first slot by a middle section having a hole therein, wherein the channel has a width greater than the thickness of the interlocking member;

the first and second slots having a width greater than the thickness of the second piece of material around the opening;

the length of the middle section of the interlocking member is smaller than or substantially equal to the opening; and the opening is configured such that the interlocking member can be inserted into the opening until the middle section of the interlocking member is located inside the opening so as to allow the first and second slots of the interlocking member to engage with the second piece of material, and to further allow the fastening member to be inserted through the aperture of the first piece of material and then the channel on the second piece of material for securely engaging with the hole of the interlocking member.

The present invention will become apparent upon reading the detailed description taken in conjunction with FIGS. 1–7b.

BEST MODE TO CARRY OUT THE INVENTION

Figure 1:
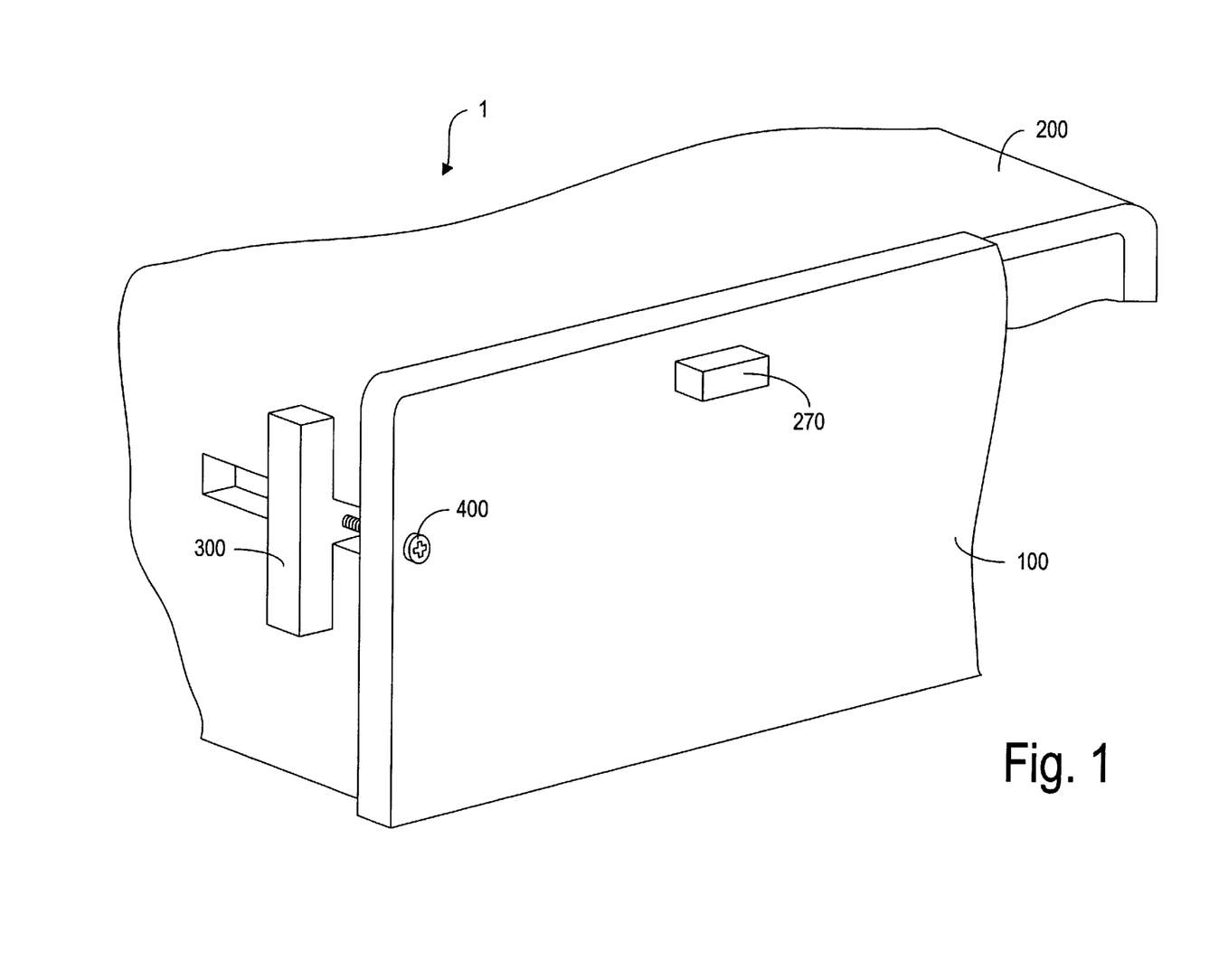
FIG. 1 is a schematic representation showing a mechanical assembly, which is assembled, according to the present invention.
Figure 2:
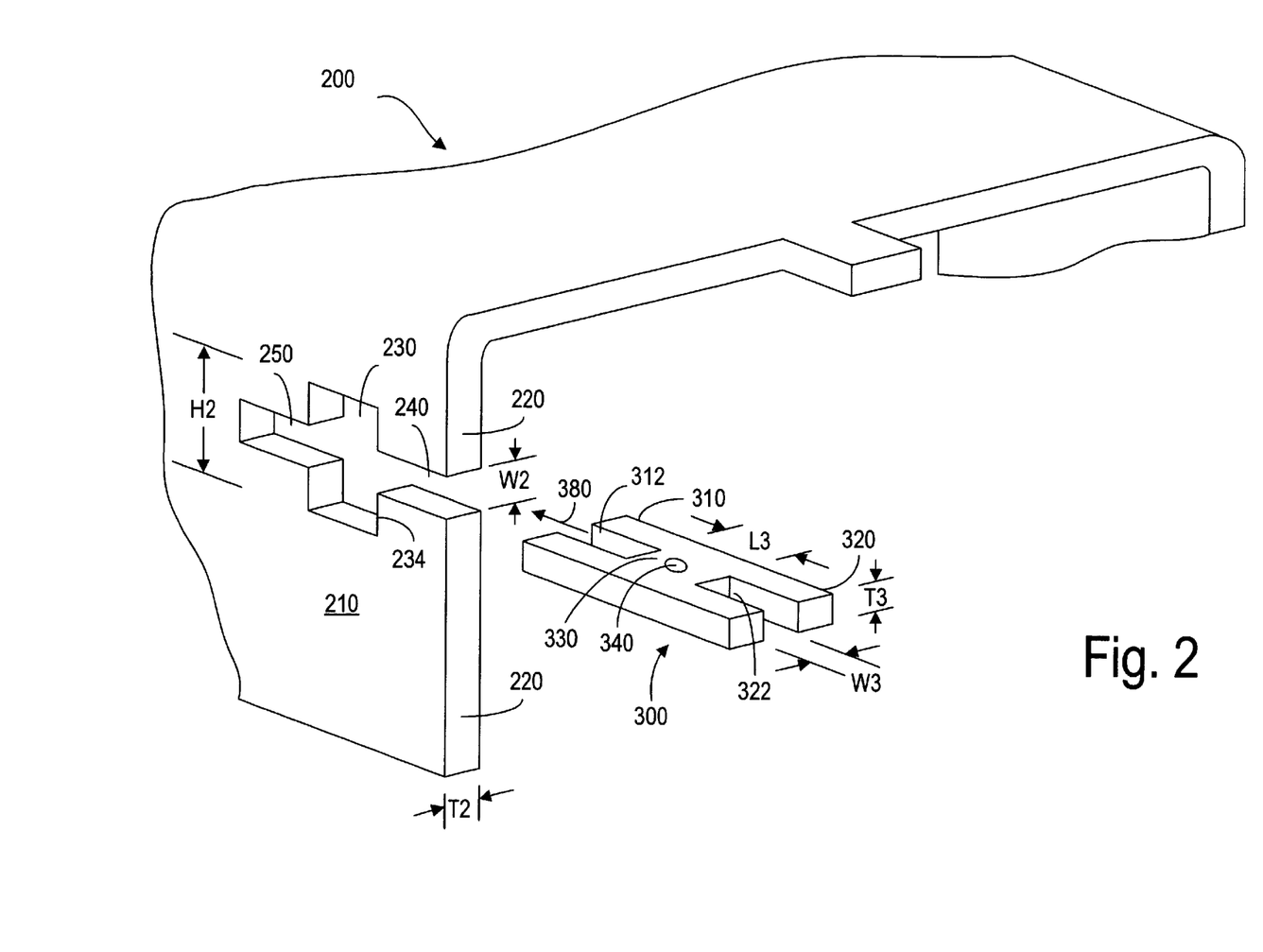
FIG. 2 is a schematic representation showing some of the parts of the mechanical assembly of FIG. 1, prior to being assembled.
Figure 3:
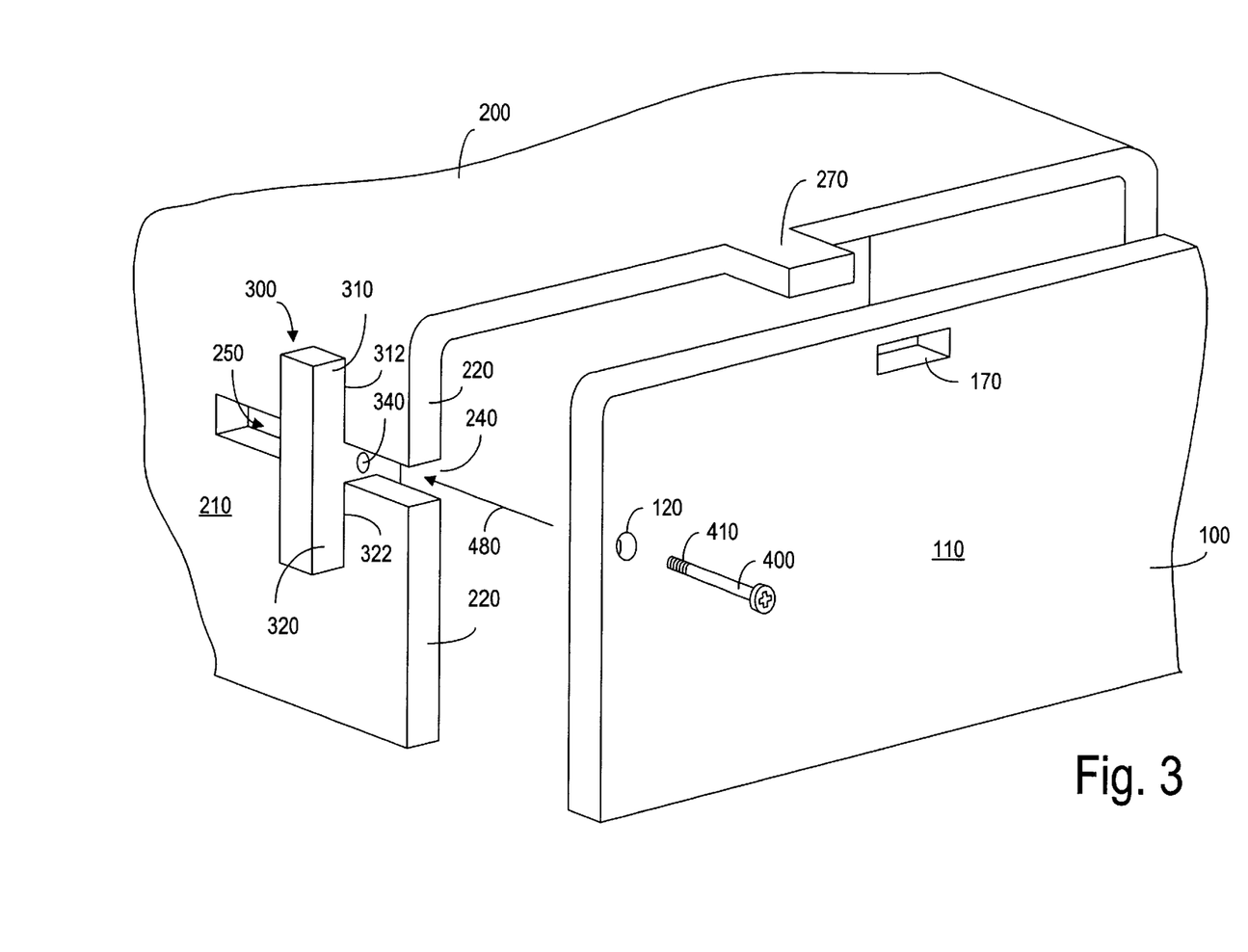
FIG. 3 is a schematic representation showing a step in mechanical assembling, according to the present invention.

When a piece of material, such as a slab of metal, is joined to another piece of material in a right angle relationship, it is possible that one edge of one piece of material is joined to the surface of the other piece. As shown in FIGS. 1–3, the pieces of material to be assembled are denoted by reference numerals 100 and 200. They are referred to hereafter as metal pieces, although the material can be metallic or plastic or another type of material. As shown in FIG. 1, the metal piece 200 is not necessarily a flat piece. It can be bent or folded or machined into a certain shape. However, it is necessary that the metal piece 200 has an edge 220 where the other metal piece 100 can be secured against the metal piece 200. The mechanical members necessary for the right angle assembly of parts, according to the present invention, are an interlocking member 300 and a fastening member 400. FIG. 1 shows the parts being securely assembled as the fastening member 400 is securely engaged with the interlocking member 300, through an aperture 120 provided on the metal piece 100 (see FIG. 3).

FIG. 2 shows the parts prior to assembly. As shown, the metal piece 200 has surface 210 adjacent to the edge 220. The thickness of the metal piece 200 near the edge 220 is denoted by T2. An opening 230 is provided on the surface 210 near the edge 220. A channel 240 communicating with the opening 230 and the edge 220 is provided so that the fastening member 400 can be engaged with the interlocking member 300 through the channel 240, as described in conjunction with FIG. 3. The opening 230, as shown in FIG. 2, has an extended end 250, but this feature is not essential, as explained later in conjunction with FIGS. 5 to 7a.

Figure 4A:
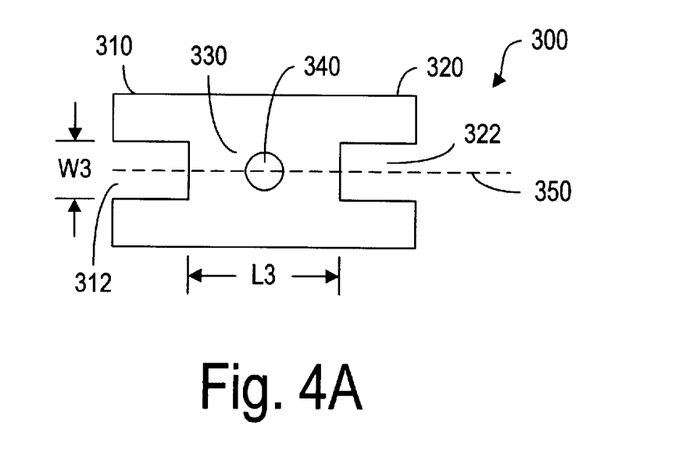
FIG. 4a is a top view showing the basic features of the interlocking member, according to the present invention.
Figure 4C:
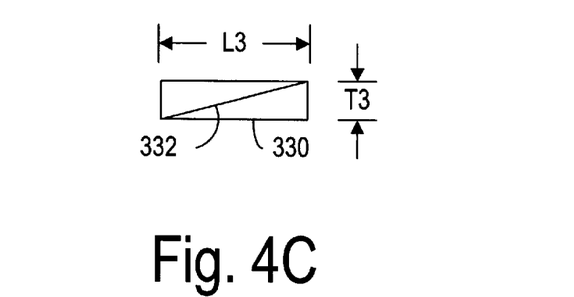
FIG. 4c is a cross sectional view of the middle section of the interlocking member.
Figure 5:
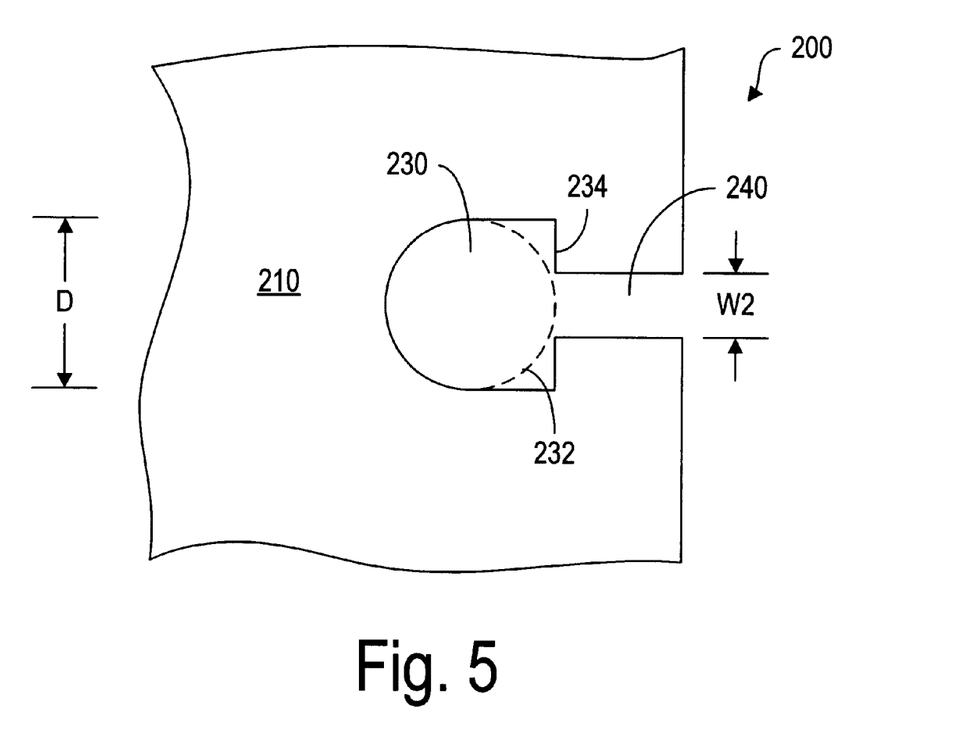
FIG. 5 is schematic representation showing the minimum requirement for the opening in one of the pieces of material to be assembled.

It is understood that the minimum size of the opening 230 depends not only on the length L3 of the middle section 330 of the interlocking member 300, but also on the thickness T3. FIG. 4c shows a cross section of the middle section as sectioned along a line parallel to the alignment axis 350 (FIG. 4a). As shown in FIG. 4c, the thickness T3 and the length L3 form a right angle of which the line 332 is the hypotenuse. The minimum size of the opening 230 is preferably substantially equal to the hypotenuse 332. Thus, the height of the opening 230, as shown in FIG. 2, and the diameter D of the circle 232, as shown in FIG. 5, may be approximately the size of the hypotenuse 332. In practice, it is preferred that the hypotenuse 332 is substantially equal to or even slightly lower than the minimum size of the opening 230 to provide a snug fit. As such, the user is required to use some force to rotate the member 330 toward its upright position perhaps even temporary deforming the member 330 or surface 210. The benefit of this arrangement is that it allows for permanent installation of the interlocking member 330 onto the metal piece 200. It also allows for a more reliable fit in that the interlocking member 330 is not likely to fall out of the opening 230.

Figure 7A:
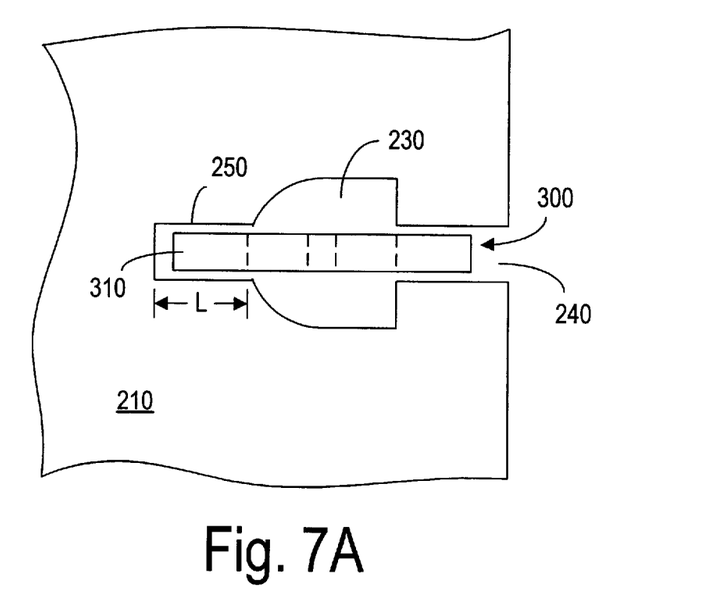
FIG. 7a is a schematic representation showing a different shape of the opening.
Figure 7B:
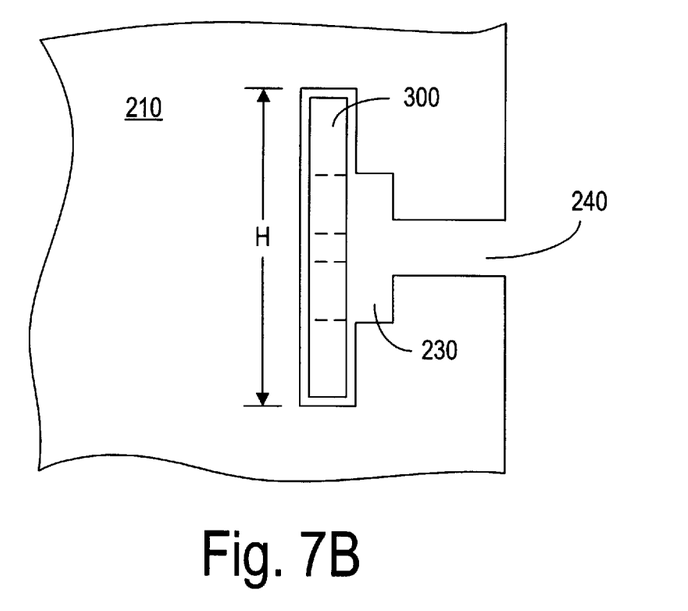
FIG. 7b is a schematic representation showing another different shape of the opening.

The interlocking member 300 is shown to be an H-shaped device. However, the shape can vary. The essential features of the interlocking member 300 are the first slot 312 on the first end 310, the second slot 322 on the second end 320, and the hole 340. As shown in FIG. 2 and FIG. 4a, the first and second slots 312, 322 are aligned with an alignment axis 350 (FIG. 4a) and they are separated by a middle section 330 on which the hole 340 is located. The length of the middle section 330 is denoted by L3 and the thickness of the interlocking member is denoted by T3. In order for the interlocking member 300 to be inserted into the opening 230, the width W2 of the channel is greater than the thickness T3 of the interlocking member 300. Also, it is essential that the width W3 of the first and second slots is greater than the thickness T2 of the metal piece 200 near the opening 230. It is preferred that the interlocking member 300 is inserted into the opening 230 through the channel 240 along a direction 380. However, the interlocking member 300 can be placed into the opening 230 in differently ways, depending on the shape of the opening 230, as shown in FIGS. 7a and 7b.

After the interlocking member 300 is inserted into the opening 230 on the metal piece 200, it is rotated away from its initial horizontal position such that both the first slot 312 and the second slot 322 engage with the surface 210 of the metal piece 200 around the opening 230. As such, the interlocking member 300 will not easily be dislodged from the opening 230. As shown in FIG. 3, the interlocking member 300 is in an upright position, ready to be mechanically engaged with the fastening member 400. At this stage, the metal piece 100 can be brought near the metal piece 200 in front of the edge 220 such that the aperture 120 of the metal piece 100 is adjacent to the channel 240. Now the fastening member 400 can be inserted through the aperture 120 and then the channel 240, along a direction 480, to engage with the hole 340 of the interlocking member 300. Preferably, the hole 340 is a tapped hole and the fastening member 400 is a screw for engaging with the tapped hole with threads. After the fastening member 400 is tightened against the hole 340, all the parts 100, 200, 300 and 400 are securely engaged with each other, as shown in FIG. 1. Advantageously, the metal piece 100 has means to register with the metal piece 200. For example, an aperture 170 is provided on the surface of the 110 of the metal piece 100 and a matching protruding member 270 is provided on the metal piece 200 for holding the metal pieces 100, 200 in place (FIG. 1).

Figure 4B:
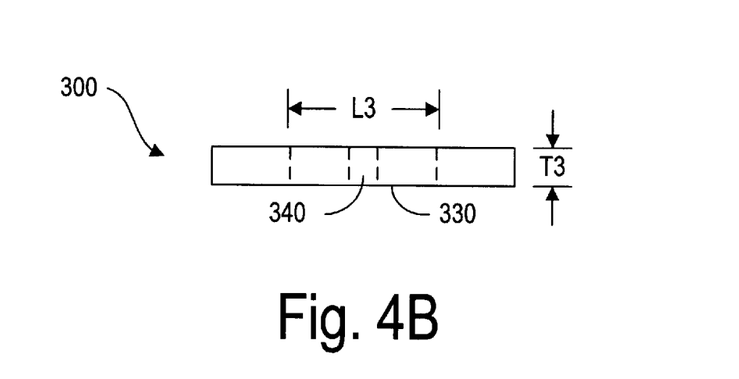
FIG. 4b is a side view showing the thickness of the interlocking member.

FIGS. 4a and 4b show some of the dimensions of the interlocking member 300 that are relevant to the present invention. Preferably, the width W3 of the first slot 312 and the second slot 322, as shown in FIG. 4a, is slightly greater than the thickness T2 of the metal piece 200 (FIG. 2) so that the interlocking member 300 can stay in place after the first end 310 and the second end 320 engage with the surface 210 of the metal piece 200 through slots 312, 322 (FIG. 3). The length L3 of the middle section 330 must be smaller than the opening 230 so that the interlocking member 300 can be rotated within the opening 230. The thickness T3 of the interlocking member 300, as shown in FIG. 4b, is smaller than the width W2 of the channel 240 (FIG. 2) so as to allow the interlocking member 300 to be inserted into the opening 230. However, the width W2 must be smaller than the length L3 of the middle section 330 so as to secure the interlocking member 300 within the opening 230.

The engagement of the fastening member 400 with the interlocking member 300, according to the present invention, is through the channel 240. Thus, the diameter of the fastening member 400 must be smaller than the width W2 of the channel 240. One of the advantages of the present invention is that the diameter of fastening member 400 can be greater than the thickness T2 of the metal piece 200 at the edge 220. This means that even when the thickness of the metal piece 200 is quite narrow, a strong fastening member 400 can still be used for the assembly. However, when widening the width W2 of the channel 240 to accommodate a large fastening member 400, one must make sure that the width W2 is smaller than the length L3 of the middle section 330 of interlocking member 300.

The shape of the opening 230 can vary. Nevertheless, the opening 230 must be wide enough to accommodate the middle section 330 of the interlocking member 300. As shown in FIG. 5, the minimum size of the opening 230 is indicated by the dashed circle 232. The diameter D of the circle 232 must be greater than the length L3 of the middle section 330 of the interlocking member 300. As such, when the interlocking member 300 is inserted through the channel 240 into the opening 230 (FIG. 2) until the middle section 330 is located within the opening 230 while the first slot 312 engages with the metal piece 200 behind the opening 230, the interlocking member 300 can be turned away from its initial position, with the middle section 330 being rotated within the circle 232. However, it is preferred that the opening 230 is further enlarged so that a straight inner edge 234 is provided near the end of the channel 240 so that the interlocking member 300 can be butted against the inner edge 234 when all the parts 100, 200, 300, 400 are securely engaged with each other, as shown in FIG. 1 and FIG. 6f below.

As shown in FIG. 2, the opening 230 is a rectangle with a height H2 and an inner edge 234. The inner edge 234 is substantially parallel to the edge 220 so as to allow the interlocking member to rest against the inner edge 234 when the fastening member 400 is securely engaged with the interlocking member 300.

Figure 6A:
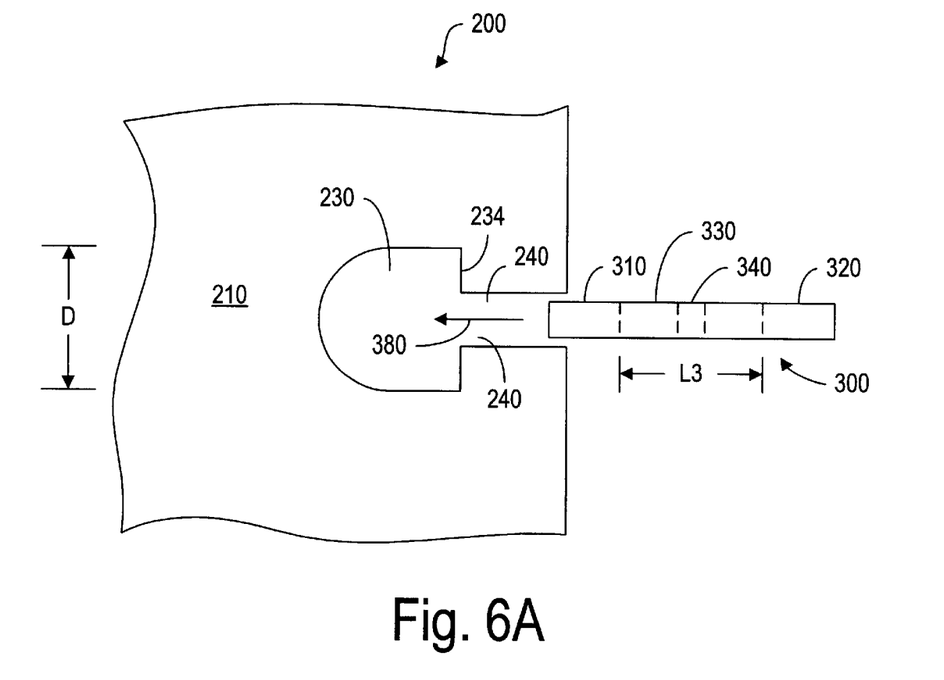
FIG. 6a is a schematic representation showing the interlocking member being inserted into the opening of FIG. 5.
Figure 6B:
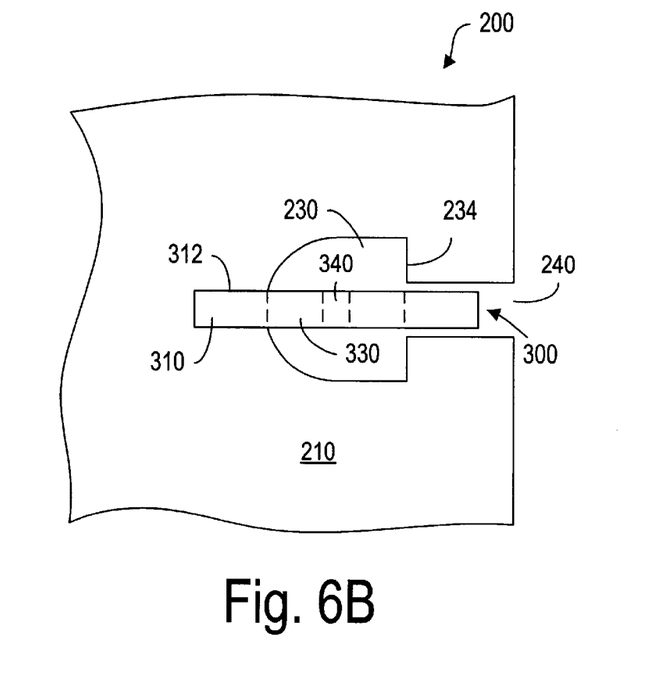
FIG. 6b is a schematic representation showing the interlocking member being engaged with the opening.
Figure 6C:
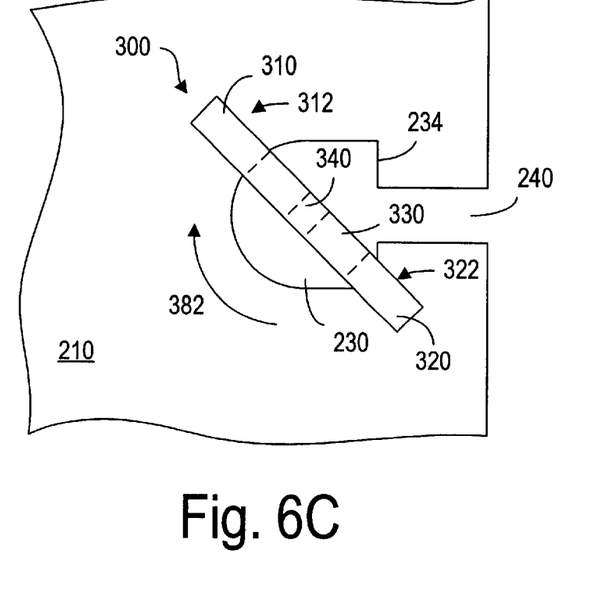
FIG. 6c is a schematic representation showing the interlocking member being rotated away from its initial position in the opening.
Figure 6D:
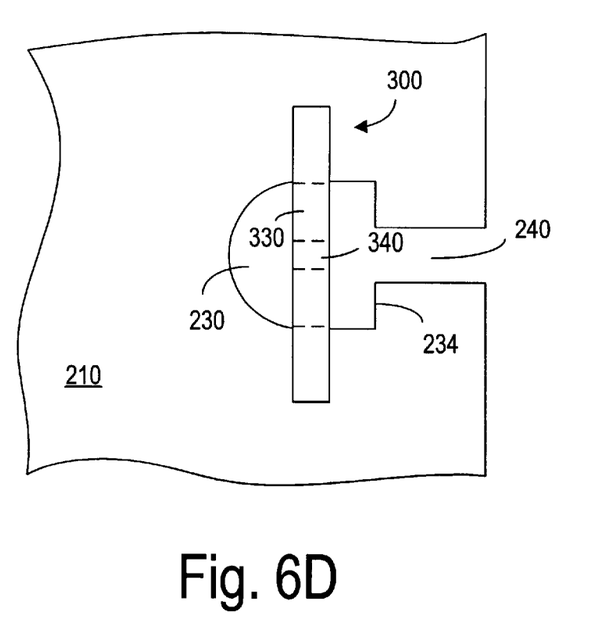
FIG. 6d is a schematic representation showing the interlocking member being rotated to an upright position.
Figure 6E:
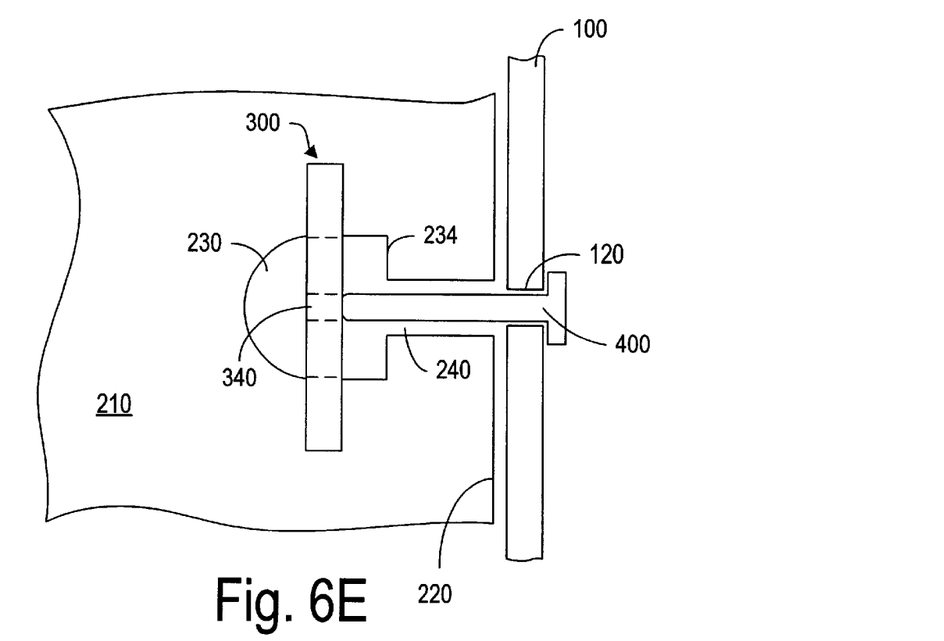
FIG. 6e is a schematic representation showing a screw being used to engage with the hole in the interlocking member.
Figure 6F:
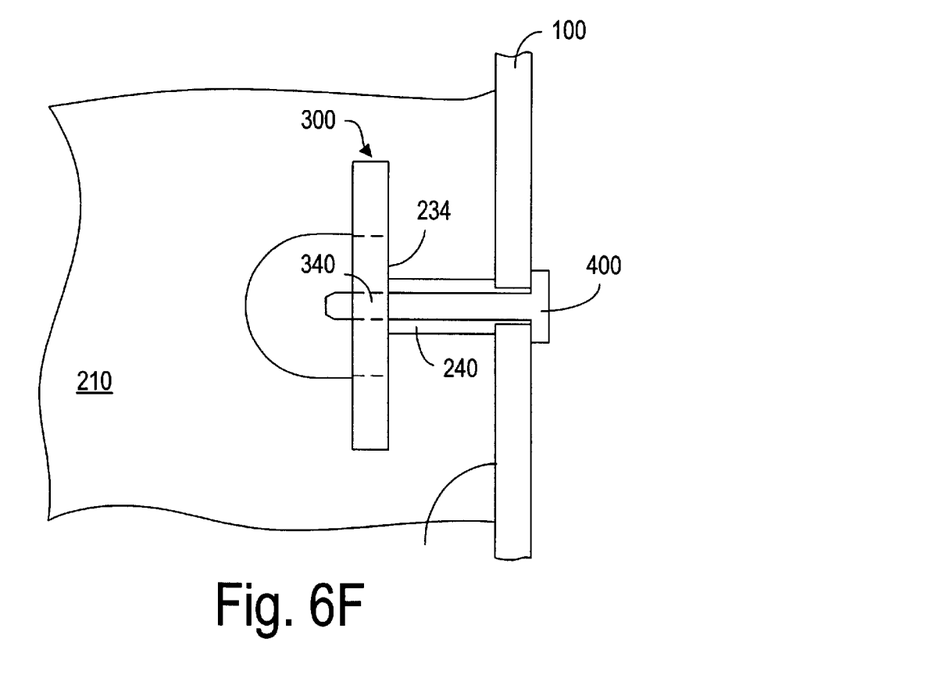
FIG. 6f is a schematic representation showing all the relevant parts being securely engaged with each other.

FIGS. 6a to 6f show the various steps in the assembling of parts 100, 200, 300, 400, according to the present invention. FIG. 6a shows the relative location of the channel 240 and the interlocking member 300 as the interlocking member 300 is inserted into the opening 230 along the direction 380. FIG. 6a shows that the first end 310 of the interlocking member 300 is inserted first into the channel 240. FIG. 6b shows the relative position of the channel 240 and the interlocking member 300 after the interlocking member 300 is fully inserted into channel 240 such that the middle section 330 is located within the opening 230. As shown, only the first slot 312 on the first end 310 engages with the metal piece 200 such that a part of the metal piece 200 resides inside the slot 312. FIG. 6c shows the relative position of the channel 240 and the interlocking member 300 when the interlocking member 300 has been rotated along a direction 382 away from its original position (FIG. 6b). Now both the first and second ends 310, 320 engage with the metal piece 200 such that one part of metal piece 200 resides inside the first slot 312 and the other part of the metal piece 200 resides inside the second slot 322. As such, the interlocking member 300 is retained by the metal piece 200. It is preferred that the interlocking member 300 is further rotated so that it is substantially perpendicular to the channel 240, as shown in FIG. 6d. After the metal piece 100 is brought near the edge 220 of the metal piece 200, it is possible to insert the fastening member 400 through the aperture 120 of the metal piece 100 and then the channel 240 into the opening 230. After the fastening member 400 is engaged with the hole 340 of the interlocking member 300, as shown in FIG. 6e, the fastening member 400 can be tightened against the hole 340 of the interlocking member 300, until the metal piece 100 is abutted against the edge 220 of the metal piece 200 and the interlocking member 300 is abutted against the edge 234 of the opening 230, as shown in FIG. 6f.

It is possible that the interlocking member 300 is placed into the opening 230 of the metal piece 200 without inserting the interlocking member 300 through the channel 240. For example, if the length L of the extended section 250 of the opening 230 is sufficiently long to accommodate the first end 310 of the interlocking device 300, as shown in FIG. 7a, the interlocking device 300 can be inserted into the opening 230 and the channel 240 from the side thereof. This means the interlocking member 300 can be placed into the opening 230 in a direction substantially perpendicular to the surface 210. Likewise, the opening 230 can be shaped like the one shown in FIG. 7b, where the height H of part of the opening 230 is greater than the entire length of the interlocking member 300. As such, the interlocking device 300 can be placed vertically inside the opening 230 without being rotated. However, the disadvantage of this insertion approach, as described in conjunction with FIGS. 7a and 7b, is that the interlocking member 300 may drop out of the opening 230 during or after the insertion.

It should be noted that there are many variations in shaping the opening 230 and the interlocking member 300. However, with the present invention, a channel 240 is provided on the metal piece 200 so that the fastening member 400 is engaged with the interlocking member 300 through the channel 240. As such, the diameter of the fastening member 400 is not limited by the thickness T2 of the metal piece 200. Furthermore, after the interlocking member 300 is rotated away from its initial position so that both of the first and second ends 310, 320 engage with the metal piece 200 through the slots 312, 322, the interlocking member 300 is retained by the metal piece 200. In that way, the interlocking member 300 would not easily be dislodged from the metal piece 200.

Thus, although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A mechanical assembly of parts comprising a first piece of material joined to a second piece of material with an interlocking member and a fastening member, wherein the interlocking member has a thickness, a first end and a second end, and the second piece of material has an edge joinable to a surface of the first piece of material, said assembly including
on the first piece of material:
an aperture provided on the surface of the first piece of material; on the second piece of material;
an opening provided near the edge of the second piece of material having a thickness around the opening;
a channel communicating the opening and the edge; and on the interlocking member:
a first slot provided on the first end along an alignment axis,
a second slot provided on the second end along the alignment axis and separated from the first slot by a middle section having a hole therein, wherein the channel has a width greater than the thickness of the interlocking member;
the first and second slots having a width greater than the thickness of the second piece of material around the opening;
the length of the middle section of the interlocking member is smaller than or substantially equal to the opening; and
the opening is configured such that the interlocking member can be inserted into the opening until the middle section of the interlocking member is located inside the opening so as to allow the first and second slots of the interlocking member to engage with the second piece of material, and to further allow the fastening member to be inserted through the aperture of the first piece of material and then the channel on the second piece of material for securely engaging with the hole of the interlocking member.

2. The assembly of claim 1, wherein the middle section of the interlocking member has a thickness, forming a right-angle triangle with the length having a hypotenuse, said assembly further including
the opening on the second piece of material having a minimum width substantially equal to the hypotenuse.

3. The assembly of claim 1, wherein the middle section of the interlocking member has a thickness, forming a right-angle triangle with the length having a hypotenuse, said assembly further including
the opening on the second piece of material having a minimum width slightly smaller than the hypotenuse.

4. The assembly of claim 1, wherein the middle section of the interlocking member has a thickness, forming a right-angle triangle with the length having a hypotenuse, said assembly further including
the opening on the second piece of material having a minimum width greater than the hypotenuse.

5. The assembly of claim 1, wherein
the opening on the second piece of material is a D-shaped aperture including a half circle extended to an inner edge, wherein the inner edge is substantially parallel to the edge of the second piece of material so as to allow the interlocking member to rest against the inner edge when the fastening member is securely engaged with the hole of the interlocking member.

6. The assembly of claim 5, wherein the middle section of the interlocking member has a thickness, forming a right-angle triangle with the length having a hypotenuse, and the half circle has a diameter, and wherein the diameter of the half circle is greater than the hypotenuse.

7. The assembly of claim 5, wherein the middle section of the interlocking member has a thickness, forming a right-angle triangle with the length having a hypotenuse, and the half circle has a diameter, and
the diameter of the half circle is substantially equal to the hypotenuse.

8. The assembly of claim 5, wherein the middle section of the interlocking member has a thickness, forming a right-angle triangle with the length having a hypotenuse, and the half circle has a diameter, and
the diameter of the half circle is smaller than the hypotenuse.

9. The assembly of claim 5, wherein
the opening on the second piece of material is a rectangle with a height and an inner edge, wherein the inner edge is substantially parallel to the edge of the second piece of material so as to allow the interlocking member to rest against the inner edge when the fastening member is securely engaged with the hole of the interlocking member.

10. The assembly of claim 9, wherein the middle section of the interlocking member has a thickness, forming a right-angle triangle with the length having a hypotenuse, and the height of the opening is substantially equal to the hypotenuse.

11. The assembly of claim 9, wherein the middle section of the interlocking member has a thickness, forming a right-angle triangle with the length having a hypotenuse, and the height of the opening is smaller than the hypotenuse.

12. The assembly of claim 9, wherein the middle section of the interlocking member has a thickness, forming a right-angle triangle with the length having a hypotenuse, and the height of the opening is greater than the hypotenuse.

13. The assembly of claim 1, wherein the hole is tapped and the fastening member is a screw.

* * * * *